May 23, 1939.  A. F. WOIDA  2,159,644

ATTACHMENT FOR STEERING GEARS OF MOTOR VEHICLES

Original Filed Dec. 13, 1937    2 Sheets-Sheet 1

INVENTOR
ARTHUR F. WOIDA
BY
ATTORNEYS

May 23, 1939.  A. F. WOIDA  2,159,644
ATTACHMENT FOR STEERING GEARS OF MOTOR VEHICLES
Original Filed Dec. 13, 1937  2 Sheets-Sheet 2

INVENTOR
ARTHUR F. WOIDA
BY
ATTORNEYS

Patented May 23, 1939

2,159,644

UNITED STATES PATENT OFFICE 2,159,644

ATTACHMENT FOR STEERING GEARS OF MOTOR VEHICLES

Arthur F. Woida, Milwaukee, Wis.

Application December 13, 1937, Serial No. 179,542
Renewed April 3, 1939

3 Claims. (Cl. 280—89)

This invention appertains to motor vehicles, and more particularly to a novel attachment or appliance for the steering gear of a motor vehicle.

One of the primary objects of my invention is to provide novel means for holding the front steering wheels of a vehicle in line, should a blowout occur in a front tire, or a steering rod or the like break, so that the vehicle can be held on the road until the same can be brought safely to a stop.

Another salient object of my invention is to provide means operated from a foot pedal or the like for engagement with certain parts of the steering knuckles on each side of a vehicle, whereby to hold the knuckles and the wheels against swinging movement, so that the vehicle can be held straight on its course.

A further object of my invention is the provision of normally raised swinging latch levers carried by and movable with the steering knuckles for engagement with arcuate keeper plates rigidly secured to the front dead axle of the vehicle or other appropriate parts, so that when the latch levers are manually depressed against their spring means, the same will engage the keeper plates and hold the steering knuckles and wheels against swinging movement.

A still further object of my invention is to provide a novel appliance of the above character, which will be durable and efficient in use, one that will be simple and easy to manufacture, and one which can be placed upon the market and incorporated with a motor vehicle at a small cost.

With these and other objects in view, the invention consists in the novel construction, arrangement, and formation of parts, as will be hereinafter more specifically described, claimed, and illustrated in the accompanying drawings, in which drawings:

Referring to the drawings in detail, wherein similar reference characters designate corresponding parts throughout the several views, the letter A generally indicates my improved appliance for a motor vehicle V.

Figure 1:
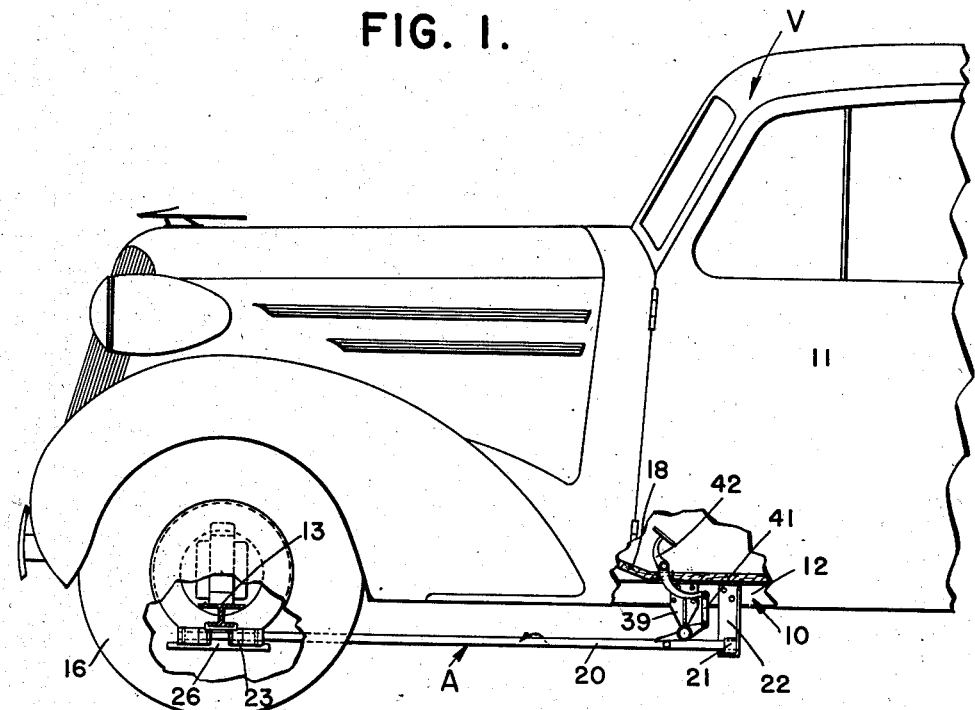
Figure 1 is a fragmentary side elevation of a motor vehicle showing my improved appliance incorporated therewith, parts of the vehicle being shown broken away and in section to illustrate structural details.
Figure 2:
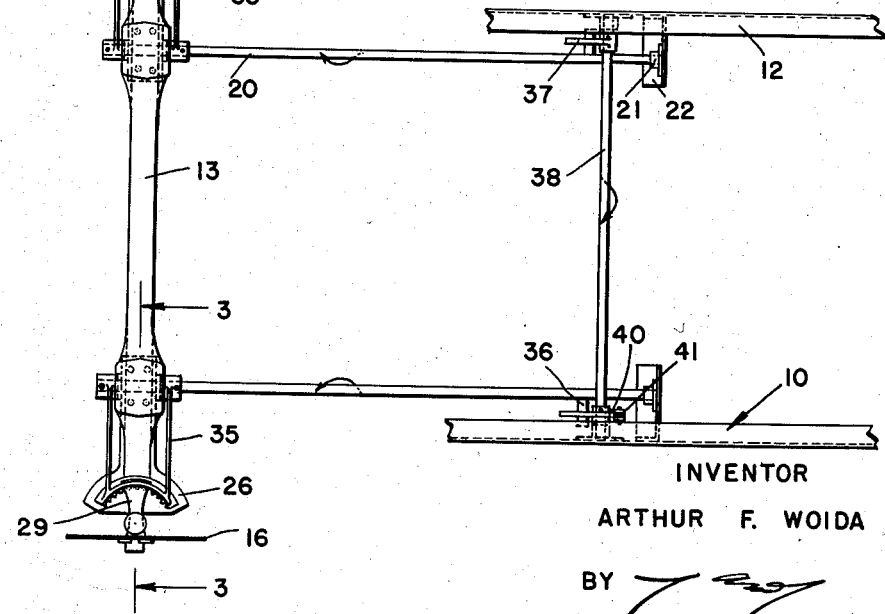
Figure 2 is a fragmentary top plan view of a vehicle chassis, showing my appliance incorporated therewith.
Figure 3:
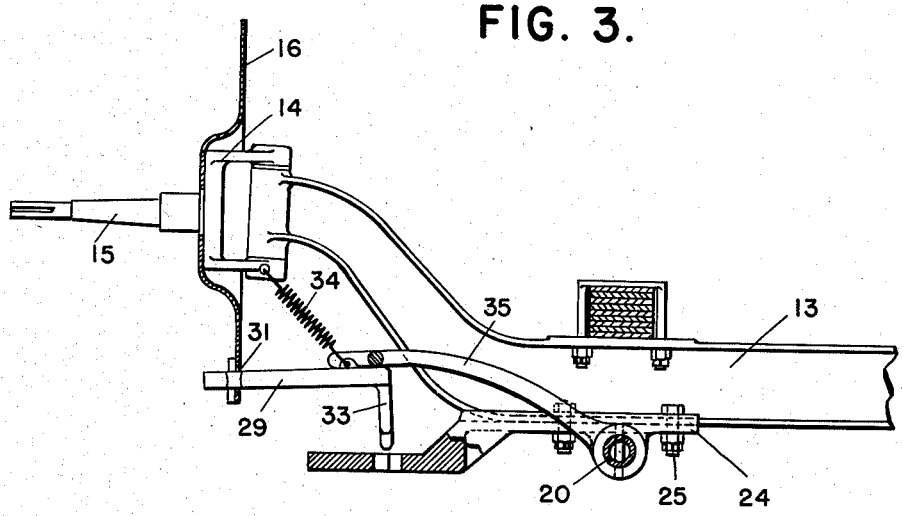
Figure 3 is an enlarged, transverse sectional view taken substantially on the line 3—3 of Figure 2, looking in the direction of the arrows.
Figure 4:
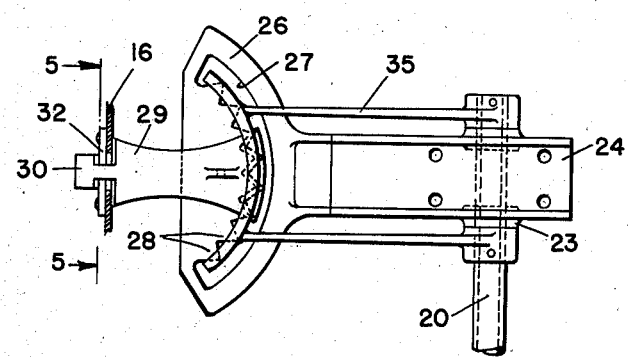
Figure 4 is a fragmentary top plan view, illustrating one of the latch levers and one of the keeper plates.
Figure 6:
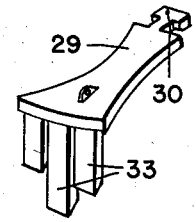
Figure 6 is a detail perspective view of one of the latch levers.
Figure 5:
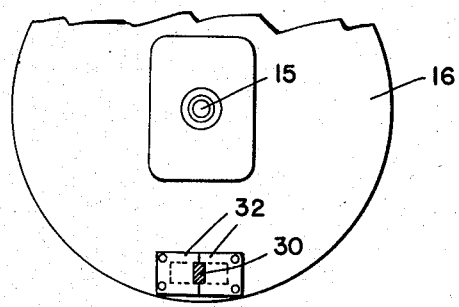
Figure 5 is a detail section taken on the line 5—5 of Figure 4, looking in the direction of the arrows, illustrating the means employed for rockably connecting a latch lever with the rigid brake drum cover.

The motor vehicle V can be of any desired size, make, or type, and for the purpose of illustration, the same has been shown to be a pleasure car. The vehicle includes a chassis 10, on which is mounted the vehicle body 11. As in the usual construction, the chassis 10 embodies the longitudinally extending frame channel beam 12, to which is connected the front dead axle 13. The terminals of the dead axle 13 carry the swinging steering knuckles 14 having spindles 15 for the front steering wheels 16. Rigidly connected with the wheel spindles 15 and the knuckles 14 are the cover plates 16 for the front wheel brake drums.

While I have shown the vehicle embodying a front dead axle 13, it is to be understood that any preferred type of knee-action mechanism can be utilized for the front steering wheels.

My improved appliance A comprises longitudinally extending rock shafts 20, which are located on each side of the vehicle adjacent to but below the channel beams 12. The rear ends of the rock shafts 20 are mounted in bearings 21 carried by the brackets 22 rigidly united with the channel beams 12. The forward ends of the rock shafts are mounted in suitable bearings 23 formed on or secured to attaching brackets 24. These brackets are connected by means of bolts 25 with the front dead axle 13. Where knee-action mechanism is utilized, the brackets 24 are connected to some other appropriate part of the vehicle chassis. Connected with or formed on the brackets 24 are keeper plates 26, and these keeper plates have formed therein arcuate slots 27. One wall of each slot is provided with teeth 28.

I provide rockable latch levers 29 for cooperation with the keeper plates 26, and the outer ends of these latch levers are provided with T-shaped heads 30, which are received in openings 31 formed in the brake cover plates 16. To hold the T-shaped heads 30 against displacement from the cover plates 16, attaching members 32 can be riveted to the cover plates 16 in such a manner that the same engage the inner faces of the T-heads. These faces of the T-heads and the outer ends of the latch levers are preferably rounded so that the levers are mounted for free rocking movement. The inner ends of the latch levers are provided with depending teeth 33, and these teeth are adapted to engage in the slot 27 when the latch levers are depressed, so that the teeth will interlock with the teeth 28 on the keeper plates. The latch levers are normally held in an elevated position by springs 34.

In order to depress the latch levers 29 against the tension of their springs 34, rock arms 35 are rigidly connected to the rock shafts 20. These rock arms overlie the latch levers 29, and when the rock shafts 20 are rotated in one direction, the rock arms 35 will be swung down so as to depress the latch levers.

Formed on the rock shafts 20, adjacent the inner ends, are crank-arms 36, and these arms are normally engaged by crank-arms 37 secured to the transverse rock shaft 38. The rock shaft 38 is suitably mounted in bearings carried by bearing brackets 39 rigidly secured to the channel beams 12. One of the crank-arms 37 is provided with a rearwardly extending arm 40, to which is pivotally connected a link 41. This link 41 is in turn pivotally connected to the lower end of a foot pedal 42. This foot pedal 42 is rockably mounted intermediate its ends and extends through the floor boards 18 of the motor vehicle.

By depressing the foot pedal 42, the transverse rock shaft 38 will be rotated, and the crank-arms 37 will engage the crank-arms 36 so as to rock the shafts 20. These shafts 20 will in turn depress the latch levers 29 and rock the steering knuckles and wheel with the rigid dead axle to hold the wheels against swinging movement.

When an accident occurs, such as the blowing out of a front tire, the operator of the vehicle can immediately depress the pedal, and the latch levers engaging the latch plates will hold the wheels against swinging movement.

The slots 27 are of an arcuate form, so that if an accident occurs while the vehicle is rounding a curve, the steering wheels can be held on the arc of the curve until the curve is completed.

Changes in details may be made without departing from the spirit or the scope of my invention, but what I claim as new is:

1. The combination with a motor vehicle including a front swinging steering knuckle, a wheel spindle, and a brake cover plate rigidly attached to the knuckle and spindle, of means for holding the spindle against accidental swinging movement including, a latch lever rockably connected with the brake cover, a keeper plate rigidly connected with the chassis of the vehicle, spring means normally holding the latch lever in a raised elevated position away from the keeper plate, and manual means for depressing the latch lever against its spring means into operative connection with the keeper plate.

2. The combination with a motor vehicle including a chassis having longitudinally extending channel beams, a front dead axle, steering knuckles carried by said axle, wheel spindles on the knuckles, and brake drum cover plates rigidly secured to the knuckles and spindles, of means for holding the knuckles and spindles against accidental swinging movement including, latch plates rigidly secured to the dead axle, longitudinally disposed rock shafts rotatably mounted upon the chassis, latch levers rockably mounted upon the cover plates, spring means normally holding the latch levers in a raised position, a transverse rock shaft carried by the chassis, means operatively connecting the transverse rock shaft to the first mentioned longitudinally disposed rock shafts, a foot pedal for operating the transverse rock shaft, and crank-arms on the first mentioned rock shaft for engaging the latch levers.

3. The combination with a motor vehicle including a chassis having longitudinally extending channel beams, a front dead axle, steering knuckles carried by said axle, wheel spindles on the knuckles, and brake drum cover plates rigidly secured to the knuckles and spindles, of means for holding the knuckles and spindles against accidental swinging movement including, latch plates rigidly secured to the dead axle, longitudinally disposed rock shafts rotatably mounted upon the chassis, latch levers rockably mounted upon the cover plates, spring means normally holding the latch levers in a raised position, a transverse rock shaft carried by the chassis, means operatively connecting the transverse rock shaft to the first mentioned longitudinally disposed rock shafts, a foot pedal for operating the transverse rock shaft, and crank-arms on the first mentioned rock shafts for engaging the latch levers, said keeper plates having arcuate slots therein and keeper teeth on one arcuate wall of the slots, and said latch levers having teeth for locking engagement with the teeth on the keeper plates.

ARTHUR F. WOIDA.